US008701171B2

(12) United States Patent
Sato (10) Patent No.: US 8,701,171 B2
(45) Date of Patent: Apr. 15, 2014

(54) APPARATUS, METHOD, AND PROGRAM FOR ACQUIRING INFORMATION DURING AN UNAVAILABLE COMMUNICATION STATE IN ACCORDANCE WITH USER IDENTIFICATION INFORMATION

(75) Inventor: Kei Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 11/829,744

(22) Filed: Jul. 27, 2007

(65) Prior Publication Data

US 2008/0040778 A1    Feb. 14, 2008

(30) Foreign Application Priority Data

Aug. 9, 2006 (JP) ................................. 2006-216557

(51) Int. Cl.
*G06F 7/04* (2006.01)
*G06F 15/16* (2006.01)
*G06F 17/30* (2006.01)
*H04L 29/06* (2006.01)
*G03G 15/00* (2006.01)
*G06Q 10/00* (2012.01)
*G06Q 40/00* (2012.01)
*G06F 15/173* (2006.01)

(52) U.S. Cl.
USPC .......... 726/7; 726/6; 399/80; 705/28; 705/43; 709/224; 709/227; 707/674

(58) Field of Classification Search
USPC ................ 399/79–80, 366; 726/3–5, 6–7, 28; 709/224, 227; 705/43; 707/674
See application file for complete search history.

(56) References Cited

U.S. PATENT DOCUMENTS

| 5,245,368 | A | * | 9/1993 | Farrell et al. .................. 358/401 |
| 5,594,863 | A | * | 1/1997 | Stiles .............................. 714/15 |
| 5,640,467 | A | * | 6/1997 | Yamashita et al. ............ 382/181 |
| 5,732,219 | A | * | 3/1998 | Blumer et al. ................ 709/227 |
| 5,778,389 | A | * | 7/1998 | Pruett et al. ....................... 1/1 |
| 5,781,909 | A | * | 7/1998 | Logan et al. ..................... 1/1 |
| 5,784,664 | A | * | 7/1998 | Nakamura et al. ............... 399/8 |
| 5,890,029 | A | * | 3/1999 | Hirata et al. ..................... 399/8 |
| 5,978,619 | A | * | 11/1999 | Kato et al. ..................... 399/80 |
| 5,991,760 | A | * | 11/1999 | Gauvin et al. ..................... 1/1 |
| 6,026,380 | A | * | 2/2000 | Weiler et al. .................... 705/34 |
| 6,061,686 | A | * | 5/2000 | Gauvin et al. ................. 707/624 |
| 6,105,028 | A | * | 8/2000 | Sullivan et al. ..................... 1/1 |
| 6,216,113 | B1 | * | 4/2001 | Aikens et al. ................... 705/34 |
| 6,288,790 | B1 | * | 9/2001 | Yellepeddy et al. ......... 358/1.15 |
| 6,498,912 | B1 | * | 12/2002 | Leni et al. ....................... 399/79 |
| 6,625,267 | B1 | * | 9/2003 | Graham et al. .......... 379/114.03 |

(Continued)

FOREIGN PATENT DOCUMENTS

JP        2002-132726 A        5/2002

*Primary Examiner* — Carolyn B Kosowski
(74) *Attorney, Agent, or Firm* — Canon USA Inc. IP Division (57) ABSTRACT

An information processing apparatus includes an authentication unit configured to identify a user who uses a data processing apparatus, a storage unit configured to store user identification information for identifying the user who is identified by the authentication unit and is identified as not having ended using the data processing apparatus, and an acquisition unit configured to, in accordance with the user identification information stored in the storage unit, acquire from the data processing apparatus information about using of the data processing apparatus by the user identified with the user identification information that has not been acquired during the state in which communication with the data processing apparatus is unavailable.

7 Claims, 7 Drawing Sheets

(56) References Cited

U.S. PATENT DOCUMENTS

| | | | |
|---|---|---|---|
| 6,819,446 B1* | 11/2004 | Ogawa et al. | 358/1.15 |
| 7,020,408 B2* | 3/2006 | Lester et al. | 399/79 |
| 7,076,184 B2* | 7/2006 | Zwiefelhofer | 399/79 |
| 7,102,780 B2* | 9/2006 | Watanabe | 358/1.15 |
| 7,180,619 B2* | 2/2007 | Ferlitsch | 358/1.15 |
| 7,292,579 B2* | 11/2007 | Morris | 370/395.4 |
| 7,353,389 B2* | 4/2008 | DeFuria et al. | 713/168 |
| 7,366,799 B2* | 4/2008 | Reddy et al. | 710/11 |
| 7,386,246 B2* | 6/2008 | Yabe | 399/82 |
| 7,386,610 B1* | 6/2008 | Vekiarides | 709/224 |
| 7,430,605 B2* | 9/2008 | Quach et al. | 709/229 |
| 7,447,764 B2* | 11/2008 | Guillemin | 709/224 |
| 7,450,873 B2* | 11/2008 | Sharma et al. | 399/79 |
| 7,526,212 B2* | 4/2009 | Zwiefelhofer | 399/8 |
| 7,571,126 B2* | 8/2009 | Nguyen et al. | 705/30 |
| 7,574,147 B2* | 8/2009 | Imai | 399/8 |
| 7,672,880 B2* | 3/2010 | Gava | 705/30 |
| 7,689,485 B2* | 3/2010 | Kanekar et al. | 705/35 |
| 7,898,939 B2* | 3/2011 | Lee et al. | 370/216 |
| 2001/0053295 A1* | 12/2001 | Kujirai et al. | 399/79 |
| 2002/0171864 A1* | 11/2002 | Sesek | 358/1.15 |
| 2003/0133562 A1* | 7/2003 | Ooki | 379/242 |
| 2003/0226464 A1* | 12/2003 | Mathieson | 101/484 |
| 2005/0129423 A1* | 6/2005 | Lester et al. | 399/79 |
| 2005/0278397 A1* | 12/2005 | Clark | 707/204 |
| 2006/0004675 A1* | 1/2006 | Bennett et al. | 705/402 |
| 2006/0123010 A1* | 6/2006 | Landry et al. | 707/10 |
| 2007/0165265 A1* | 7/2007 | Ito et al. | 358/1.15 |
| 2007/0258112 A1* | 11/2007 | Levine | 358/448 |

* cited by examiner

| | 501 | 502 | 503 |
|---|---|---|---|
| | USER ID | LOG-IN TIME | LOG-OUT TIME |
| | USER A | 2006. 01.01 01:01:00 | 2006. 01.01 01:02:00 |
| | USER B | 2006. 01.01 01:03:00 | 2006. 01.01 01:04:00 |
| | USER C | 2006. 01.01 01:05:00 | 2006. 01.01 01:06:00 |
| | USER D | 2006. 01.01 01:07:00 | |
| | ... | ... | ... |

| USER ID | LOG-IN USER NAME | LOG-IN PASSWORD | NUMBER OF PRINTABLE COPIES | NUMBER OF ACTUALLY PRINTED COPIES | UPPER LIMIT NUMBER OF PRINTABLE COPIES |
|---|---|---|---|---|---|
| 001 | USER A | PASS A | 100 | 400 | 500 |
| 002 | USER B | PASS B | 200 | 300 | 500 |
| 003 | USER C | PASS C | 300 | 200 | 500 |
| 004 | USER D | PASS D | 400 | 100 | 500 |
| ... | ... | ... | ... | ... | ... |

FIG.7

| USER ID | PRINTING DATE AND TIME | NUMBER OF PRINTS | NOTIFICATION OF NUMBER OF PRINTS |
|---|---|---|---|
| USER C | 2006. 01.01. 01:05:30 | 10 | COMPLETED |
| USER A | 2006. 01.01. 10:07:30 | 20 | COMPLETED |
| USER A | 2006. 01.01. 10:07:30 | 15 | |
| ... | ... | ... | ... |

FIG.8

STORAGE MEDIUM SUCH AS FD/CD-ROM

DIRECTORY INFORMATION

PROGRAM CODE CORRESPONDING TO STEPS IN FLOW CHART OF FIG.5

PROGRAM CODE CORRESPONDING TO STEPS IN FLOW CHART OF FIG.6

APPARATUS, METHOD, AND PROGRAM FOR ACQUIRING INFORMATION DURING AN UNAVAILABLE COMMUNICATION STATE IN ACCORDANCE WITH USER IDENTIFICATION INFORMATION

CROSS REFERENCE TO RELATED APPLICATIONS

This application claims priority from Japanese Patent Application No. 2006-216557 filed Aug. 9, 2006, which is hereby incorporated by reference herein in its entirety.

BACKGROUND OF THE INVENTION

1. Field of the Invention

The present invention relates to a data processing apparatus and an information processing apparatus capable of identifying a user of a data processing apparatus and acquiring information about use of the data processing apparatus by the user from the data processing apparatus.

2. Description of the Related Art

Japanese Patent Application Laid-Open No. 2002-132726 discusses an information processing apparatus that authenticates a user desiring to use a printing apparatus and acquires fee charging information according to a function and a size of paper used by the user from the printing apparatus.

When communication fails between an information processing apparatus and a data processing apparatus, the information processing apparatus cannot acquire information about use of the data processing apparatus by the user from the data processing apparatus.

As a general method for addressing communication failure between apparatuses, in a conventional method, information is periodically and continuously sent until communication between the apparatuses can be restored. However, in such a conventional method, wasteful information transmission is required.

SUMMARY OF THE INVENTION

The present invention is directed to a method for reducing wasteful information transmission in acquiring information about use of a data processing apparatus by a user that has not been received by an information processing apparatus during a period in which communication between the information processing apparatus and the data processing apparatus is unavailable.

According to an aspect of the present invention, an information processing apparatus includes: an authentication unit configured to identify a user who uses a data processing apparatus; a storage unit configured to store user identification information for identifying the user who is identified by the authentication unit and is identified as not having ended using the data processing apparatus; and an acquisition unit configured to, when communication with the data processing apparatus is restored from a state in which communication with the data processing apparatus is unavailable, acquire, in accordance with the user identification information stored in the storage unit, from the data processing apparatus information about using of the data processing apparatus by the user identified with the user identification information that has not been acquired during the state in which communication with the data processing apparatus is unavailable.

According to another aspect of the present invention, an information processing system includes an information processing apparatus and a data processing apparatus. The information processing apparatus includes: an authentication unit configured to identify a user who uses the data processing apparatus; a storage unit configured to store user identification information for identifying the user who is identified by the authentication unit and is not identified as having ended using the data processing apparatus; and an acquisition unit configured to, when communication between the information processing apparatus and the data processing apparatus is restored from a state in which communication between the information processing apparatus and the data processing apparatus is unavailable, acquire, in accordance with the user identification information stored in the storage unit, from the data processing apparatus information about using of the data processing apparatus by the user identified with the user identification information that has not been acquired during the state in which communication between the information processing apparatus and the data processing apparatus is unavailable. The data processing apparatus includes: a first sending unit configured to send to the information processing apparatus information about using of the data processing apparatus by the user identified by the authentication unit; and a second sending unit configured to, when communication between the information processing apparatus and the data processing apparatus is restored from a state in which communication between the information processing apparatus and the data processing apparatus is unavailable, send to the information processing apparatus information about using of the data processing apparatus by the user identified with the user identification information that has not been sent during the state in which communication between the information processing apparatus and the data processing apparatus is unavailable.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
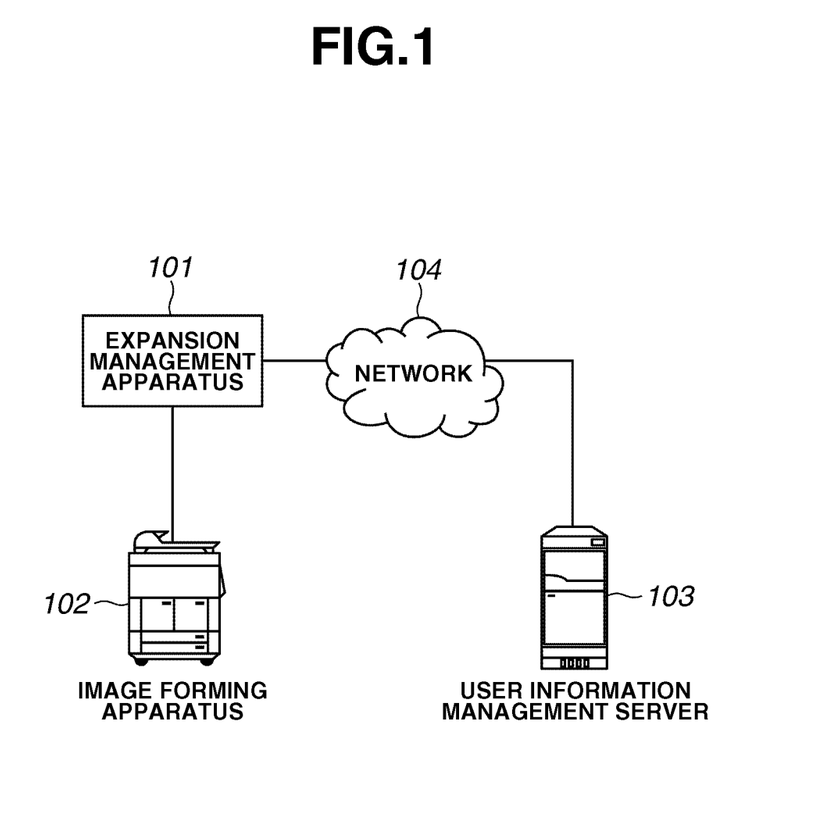
FIG. 1 illustrates an exemplary configuration of an information processing system.

Now, an exemplary embodiment of the present invention will be described below. FIG. 1 illustrates an exemplary configuration of an information processing system (hereinafter referred to as an "image forming system").

Referring to FIG. 1, the image forming system includes a data processing apparatus (hereinafter referred to as an "image forming apparatus") 102. An information processing apparatus (hereinafter referred to as an "expansion management apparatus") 101 communicates with the image forming apparatus 102 to manage the image forming apparatus 102. A user information management server 103 stores authority information of a user who has logged into the image forming system.

A network 104 includes the Internet, an intranet, or a local area network (LAN). The expansion management apparatus 101 and the user information management server 103 are in communication with each other via the network 104.

Figure 2:
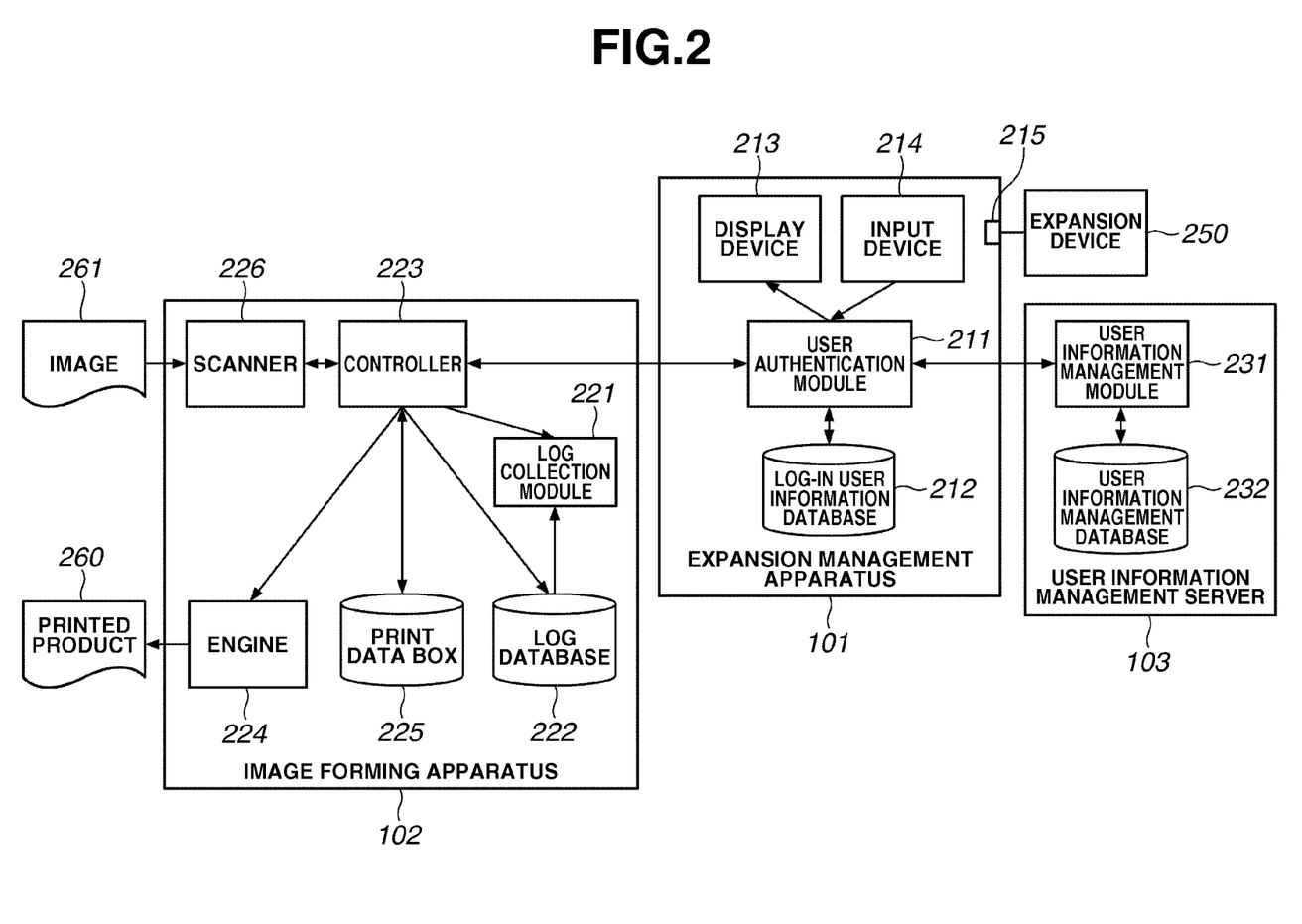
FIG. 2 illustrates an exemplary configuration of an image forming system illustrated in FIG. 1.

FIG. 2 illustrates a detailed exemplary inner configuration of each component of the image forming system illustrated in FIG. 1.

Referring to FIG. 2, the expansion management apparatus 101 includes a display device 213 and an input device 214. A liquid crystal display (LCD) and a cathode ray tube (CRT) display can be used as the display device 213. The input device 214 can include a keyboard, a pointing device, and a card reader. The expansion management apparatus 101 includes a device connection interface 215, such as a universal serial bus (USB). An expansion device 250, such as the above-described display device 213 and input device 214, can be connected to the expansion management apparatus 101 via the device connection interface 215.

The expansion management apparatus 101 can be an ordinary computer including a central processing unit (CPU) (not shown), a read-only memory (ROM) (not shown), a random access memory (RAM) (not shown), and an external storage apparatus (e.g., a hard disk (HD)) (not shown). A user authentication module 211 is implemented by reading a program stored on the external storage apparatus and executing the read program in the RAM with the CPU.

The user authentication module 211 acquires a user identification (ID) (user identification information) from a user information management module 231 according to user information received from the input device 214. The user authentication module 211 stores the acquired user ID in a log-in user information database 212. The user information includes a log-in user name and a log-in password.

The user authentication module 211 can use a function of the image forming apparatus 102 by communicating with a controller 223. The log-in user information database 212 is implemented within the external storage apparatus.

The user authentication module 211 can control the display device 213 and the input device 214.

An application for displaying a print preview image on the display device 213 can be installed on the expansion management apparatus 101. The application, as well as the user authentication module 211, can be executed by the CPU. Thus, the expansion management apparatus 101 can provide a service customized according to a purpose of use of the user.

The image forming apparatus 102 includes a log collection module 221, a log database 222, a controller 223, an engine 224, a print data box 225, and a scanner 226.

The controller 223 includes a CPU (not shown), a ROM (not shown), and a RAM (not shown). The CPU controls the module in the image forming apparatus 102 by reading and executing a program stored in the ROM. The log collection module 221 is implemented by reading and executing a program stored on the ROM with the CPU of the controller 223.

The engine 224 prints an image and outputs a printed product 260. The controller 223 transfers print data to the engine 224 to print the print data. In addition, the engine 224 temporarily stores print data in the print data box 225. Furthermore, the controller 223 can acquire the print data stored in the print data box 225 to allow the engine 224 to print an image according to the acquired print data.

The scanner 226 includes an operation unit (not shown). The scanner 226 scans an image 261 and generates print data according to an instruction by the user performed via the operation unit. The log collection module 221 searches for a desired print log from the log database 222 and sends the print log to a request source module.

The image forming apparatus 102 includes an external storage apparatus (e.g., an HD) (not shown). The print data box 225 and the log database 222 are implemented on the external storage apparatus.

The user information management server 103 includes a user information management database 232 and a user information management module 231. The user information management database 232 stores authority information of each user. The user information management module 231 manages the user information management database 232.

The user information management module 231, according to a request for authority information from the user authentication module 211, searches the user information management database 232 for a user ID and authority information included in user information sent from the user authentication module 211. The user information management module 231 sends the acquired authority information and user ID to the user authentication module 211.

The user information management server 103 can be an ordinary computer including a CPU (not shown), a ROM (not shown), a RAM (not shown), and an external storage apparatus (e.g., an HD)) (not shown). The user information management module 231 is implemented by reading a program stored on the external storage device and executing the read program on the RAM with the CPU. The user information management database 232 is implemented within the external storage apparatus.

Figure 3:
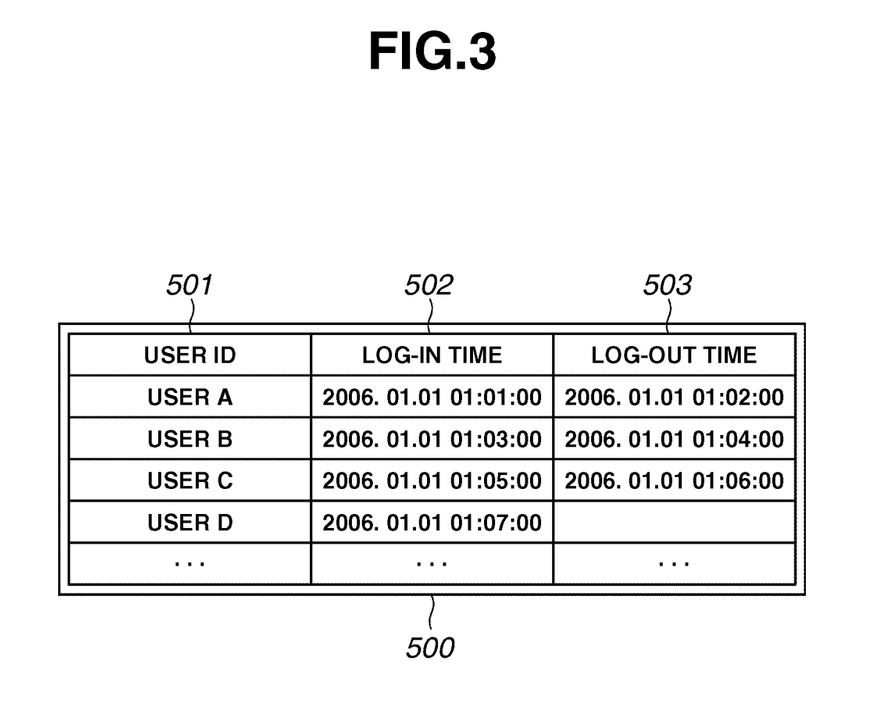
FIG. 3 illustrates an example of a log-in user information table stored in a log-in user information database illustrated in FIG. 2.

FIG. 3 illustrates an example of a log-in user information table stored in the log-in user information database 212 illustrated in FIG. 2.

Referring to FIG. 3, a log-in user information table 500 includes three fields, namely, a user ID field 501, a log-in time field 502, and a log-out time field 503.

The user ID field 501 indicates identification information for identifying a user who logged into the image forming system. The log-in time field 502 indicates the time the user logged into the image forming system. The log-out time field 503 indicates the time the user logged out of the image forming system. If a user whose log-in time is written but whose log-out time is not written exists, the user is identified with the user ID as not having ended using the image forming apparatus 102. That is, the user is identified as being currently logged into the image forming apparatus 102.

In the present exemplary embodiment, every time a user logs in, the user ID of the user is additionally stored in the log-in user information table 500. However, the configuration can be arranged such that only the user ID of a user currently logging in is stored and the user ID of the user is deleted from the log-in user information table 500 at the time of logging out.

Figure 4:
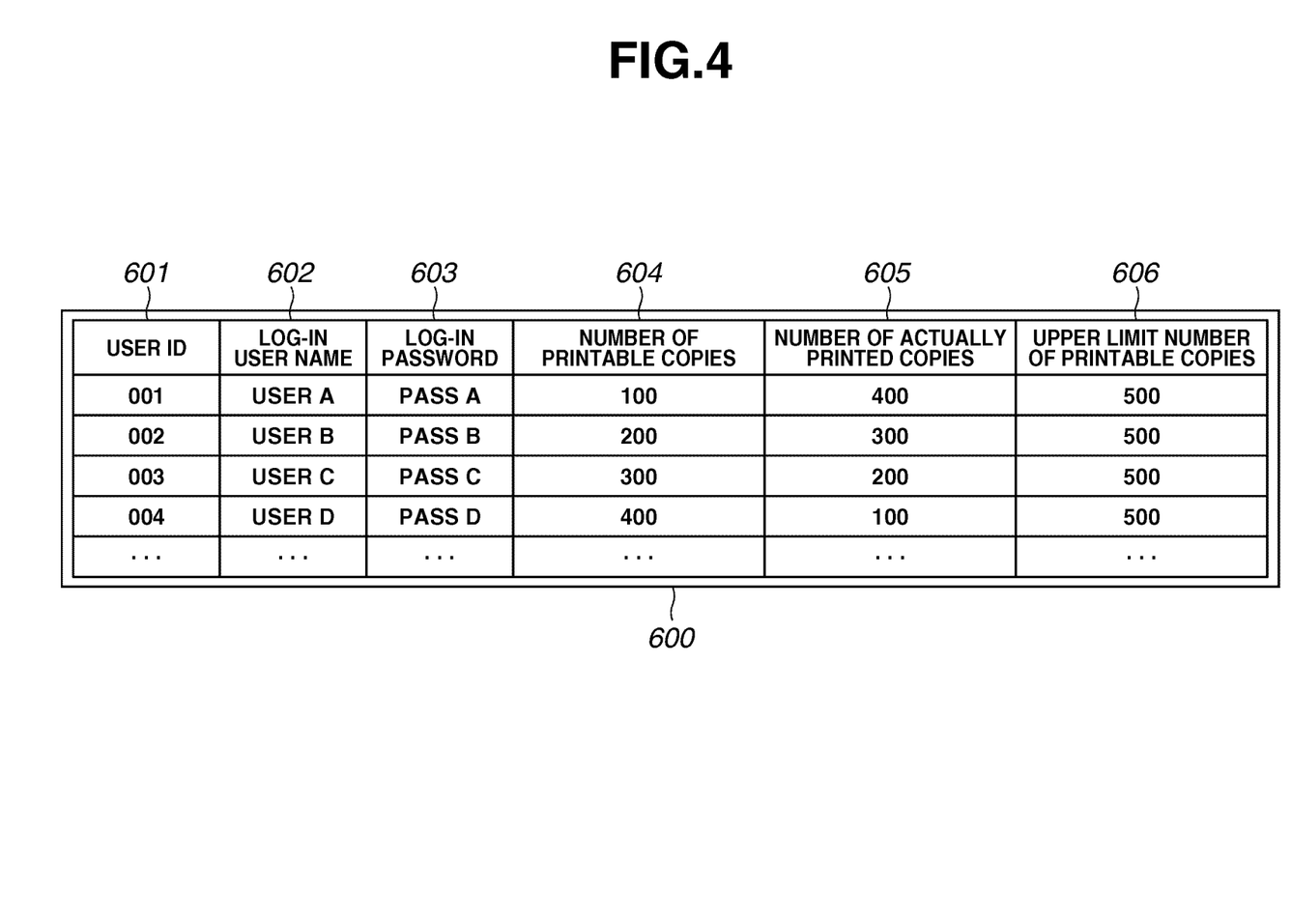
FIG. 4 illustrates an example of authority information stored in the user information database.

FIG. 4 illustrates an example of authority information stored in the user information management database 232 illustrated in FIG. 2.

Referring to FIG. 4, a user authority information table 600 includes six fields for a user ID 601, a log-in user name 602, a log-in password 603, a number of printable copies 604, a number of actually printed copies 605, and an upper limit number of printable copies 606.

The user ID 601 indicates identification information for identifying a user. The log-in user name 602 and the log-in password 603 are used in combination. The user enters the log-in user name 602 and the log-in password 603 via the input device 214, such as a keyboard or an ID card reader, at the time of logging into the image forming system. After user authentication with the entered log-in user name 602 and log-in password 603 is performed, the user ID 601 corresponding to the entered log-in user name 602 and log-in password 603 is used as identification information for identifying a log-in user of the image forming system.

The number of printable copies 604 indicates a number of copies that the user can print at the current time. The number of printable copies 604 can be obtained by computing a difference between the upper limit number of printable copies 606 and the number of actually printed copies 605. The number of actually printed copies 605 indicates a number of copies that the user has printed thus far. The upper limit number of printable copies 606 indicates an upper limit of the number of copies that the user can print at the current time.

In the present exemplary embodiment, three kinds of information, namely, the number of printable copies 604, the number of actually printed copies 605, and the upper limit number of printable copies 606, are stored in the user authority information table 600. However, only the number of printable copies 604 can be stored in the user authority information table 600. In addition, in the present exemplary embodiment, only one user authority information table is used. However, different user authority information tables can be respectively provided to image forming apparatuses on which restriction on the number of printable copies is applied to control the number of printable copies.

Now, an example of processing for controlling the number of printable copies performed with a copy function will be described below with reference to FIG. 5 and FIG. 6.

First, processing starting with user authentication and ending with updating of the number of actually printed copies, which is performed in the course of processing for controlling the number of prints, will be described with reference to FIG. 5.

Figure 5:
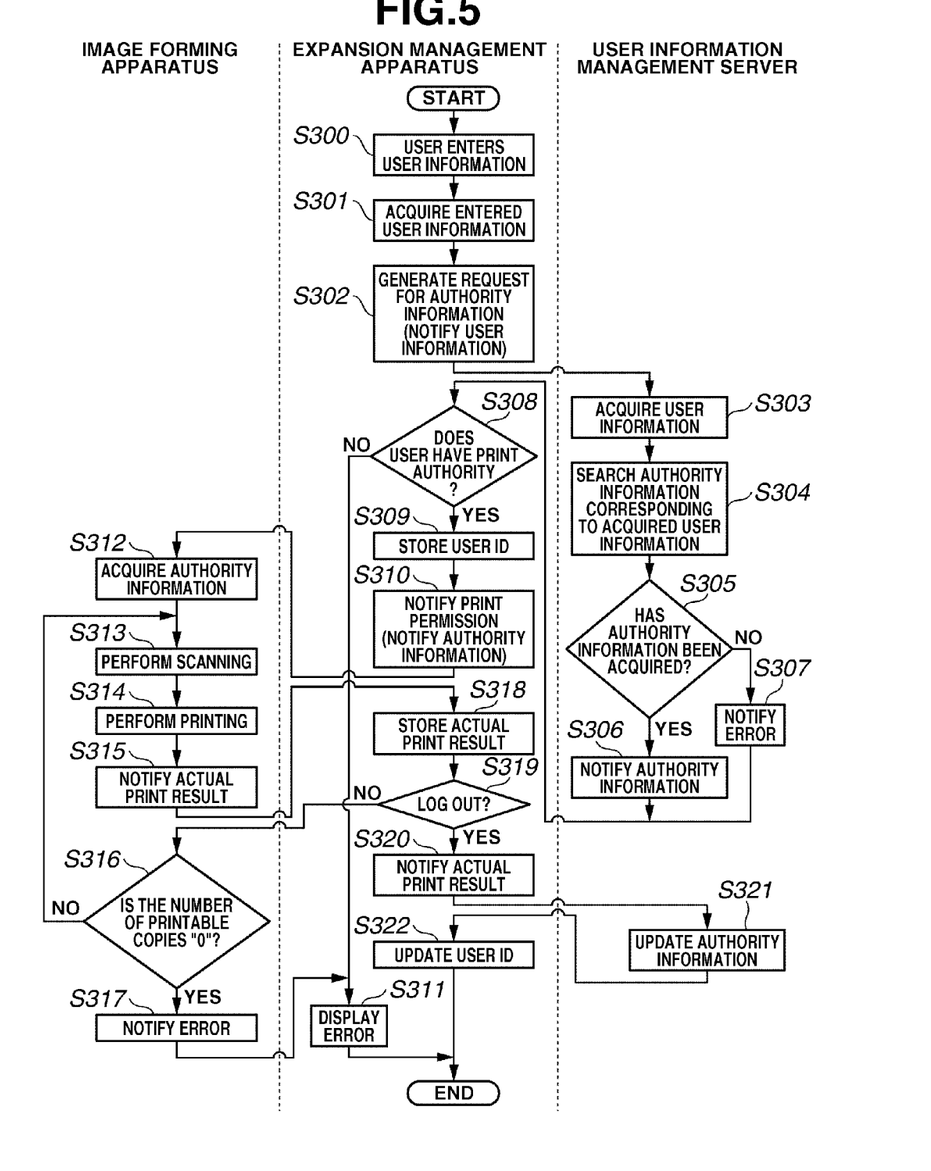
FIG. 5 is a flow chart illustrating an example of processing for controlling the number of prints.

FIG. 5 is a flow chart illustrating an example of processing for controlling the number of prints. The processing illustrated in FIG. 5 corresponds to the processing starting with user authentication and ending with updating of the number of actually printed copies, which is performed in the course of processing for controlling the number of prints. Steps S300 through S302, S308 through S311, S318 through S320, and S322 of the processing illustrated in FIG. 5 are performed by the user authentication module 211 of the expansion management apparatus 101 illustrated in FIG. 2. Steps S312 through S317 are performed by the controller 223 and the log collection module 221 of the image forming apparatus 102 illustrated in FIG. 2. Steps S303 through 307 and S321 are performed by the user information management module 231 of the user information management server 103 illustrated in FIG. 2.

Referring to FIG. 5, first, a user who desires to perform print processing with the image forming apparatus 102 is required to log into the image forming system. In order to log into the image forming system, in step S300, the user enters user information via the input device 214 of the expansion management apparatus 101 or via the expansion device 250.

In step S301, the user authentication module 211 of the expansion management apparatus 101 acquires the user information entered by the user who desires to log into the image forming system, from the input device 214 or the expansion device 250. Here, the user information includes a log-in user name and a log-in password.

In step S302, the user authentication module 211 requests authority information (here, the number of printable copies) and the user ID corresponding to the user information acquired in step S301. Here, in order to generate a request for authority information and the user ID corresponding to the user information acquired in step S301, the user authentication module 211 sends the acquired user information to the user information management module 231 of the user information management server 103.

In step S303, the user information management module 231 acquires the user information sent from the user authentication module 211.

In step S304, the user information management module 231 searches for the authority information and user ID corresponding to the acquired user information from the user authority information table 600 in the user information management database 232.

In step S305, the user information management module 231 verifies a result of the search to determine whether the authority information and the user ID have been acquired. If it is determined in step S305 that the authority information and the user ID have been acquired (YES in step S305), the processing advances to step S306. In step S306, the user information management module 231 sends the user ID corresponding to the user information and information about the number of printable copies corresponding to the user information to the user authentication module 211.

On the other hand, if it is determined in step S305 that the authority information has not been acquired (that is, if no data corresponding to the user information exists) (NO in step S305), then the processing advances to step S307. In step S307, the user information management module 231 sends error information to the user authentication module 211.

In step S308, the user authentication module 211 acquires and stores in RAM (not shown) authority information (the user ID and the information about the number of printable copies) or an error notification obtained from the user information management module 231. In step S308, based on the information obtained from the user information management module 231, the user authentication module 211 checks whether the user has a print authority. If it is determined in step S308 that the user does not have print authority (NO in step S308), that is, if the number of printable copies is "0", or if the user authentication module 211 has received the error information in step S308, the processing advances to step S311. In step S311, the user authentication module 211 displays an error message (that the user has no print authority, that the number of printable copies is "0", or that an error has occurred) on the display device 213, and the processing ends.

On the other hand, if it is determined in step S308 that the user has a print authority (YES in step S308), then the user authentication module 211 advances to step S309. In step S309, the user authentication module 211 writes the acquired user ID into the user ID 501 of the user information table 500 and a current time into the log-in time 502.

The processing for authenticating the user who desires to log into the image forming apparatus is completed with the above-described steps. Subsequently, in step S310, the user authentication module 211 sends print permission information including the user ID and the information about the number of printable copies to the controller 223 of the image forming apparatus 102. Processing for actual printing with the image forming apparatus 102 starts with the processing in step S310.

In step S312, the controller 223 of the image forming apparatus 102 acquires the print permission information from the user authentication module 211, stores the acquired user ID and the information about the number of printable copies on the RAM (not shown), and permits the user to use the image forming apparatus 102.

After the controller 223 has acquired the print permission information from the user authentication module 211 in step S312, the user, having a permission for printing, can start a copy operation. In step S313, when the user starts a copy operation via the operation unit (not shown) of the scanner 226, the controller 223 scans an image to generate image data with the scanner 226.

In step S314, the controller 223 prints an image corresponding to the generated image data with the engine 224. At this time, the controller 223 writes information about the number of prints in the print processing in step S314 (information about using of the image forming apparatus 102 by the user), the user ID, and the current time into the log database 222.

Figure 7:
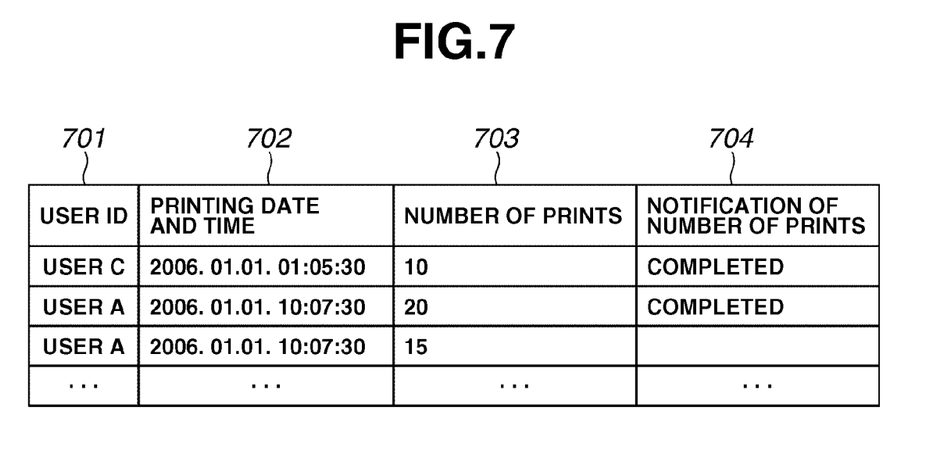
FIG. 7 illustrates an example of a log database illustrated in FIG. 2.

The log database 222 will be described with reference to FIG. 7. FIG. 7 illustrates an example of the log database 222 illustrated in FIG. 2.

Referring to FIG. 7, the log database 222 includes four fields for a user ID 701, a printing date and time 702, a number of prints 703, and a notification of number of prints 704. The user ID 701 indicates identification information for identifying the user who has instructed printing. In step S314, the user ID of the user who has logged into the image forming system is written into the user ID 701. The printing date and time 702 indicates the time the printing was performed. In step S314, the current time is written into the printing date and time 702. The number of prints 703 indicates the number of prints in the print processing performed in step S314. The notification of number of prints 704 indicates information about whether notification of the number of prints has been completed.

The user can select as to whether the image data is to be printed after scanning or to be stored in the print data box 225. The image data to be used in the print processing in step S314 is stored in the print data box 225. However, image data previously generated with the scanner 226 can be used as the image data to be used in the print processing in step S314.

After the print processing in step S314 is completed, in step S315, the controller 223 sends information about the number of prints in the print processing in step S314 (information about using of the image forming apparatus 102 by the user) to the user authentication module 211. At this time, the controller 223, as well as sending the number of prints to the user authentication module 211, writes information indicating that the notification of the number of prints has been completed into the log database 222. Here, the information indicating that the notification of the number of prints has been completed is written into the notification of number of prints 704.

In step S318, the user authentication module 211 of the expansion management apparatus 101 stores the information about the number of prints (information about using of the image forming apparatus 102 by the user) received from the image forming apparatus 102 on the RAM (not shown). When a plurality of pieces of information about the number of prints is sent from the image forming apparatus 102, the user authentication module 211 stores information about the total number of prints in the RAM (not shown).

In step S319, the user authentication module 211 checks if the user has logged out of the image forming system. Here, an instruction for logging out (instruction for ending using of the data processing apparatus by the user) is notified via the input device 214. When no information is entered after a predetermined length of time has elapsed, the user authentication module 211 can automatically perform log-out processing.

If it is determined in step S319 that the user has not logged out (NO in step S319), then processing advances to step S316 and the user authentication module 211 permits the user to continue using the image forming apparatus 102.

In step S316, the controller 223 subtracts the number of prints from the number of printable copies included in the information stored on the RAM (not shown) to check whether the number of printable copies is "0". If it is determined in step S316 that the number of printable copies is not "0" (NO in step S316), then the processing returns to step S313 and the controller 223 allows the user to continue using the image forming apparatus 102.

On the other hand, if it is determined in step S316 that the number of printable copies included in the information stored in the RAM (not shown) is "0" (YES in step S316), then the controller 223 advances to step S317. In step S317, the controller 223 sends error information to the user authentication module 211.

After receiving the error information, in step S311, the user authentication module 211 displays a content of the error on the display device 213, and the processing ends.

On the other hand, if it is determined in step S319 that the user has logged out of the image forming system (YES in step S319), then the user authentication module 211 advances to step S320. In step S320, the user authentication module 211 sends the information about the number of prints stored on the RAM (not shown) in step S318 and the user ID 601 to the user information management module 231.

After receiving the user ID and the information about the number of prints, in step S321, the user information management module 231 updates the number of actually printed copies 605 corresponding to the user ID 601 stored in the user information management database 232 according to the number of prints indicated by the received information. Furthermore, the user information management module 231 computes a difference between the upper limit number of printable copies 606 and the number of actually printed copies 605 to update the number of printable copies 604. Subsequently, the user information management module 231 sends information indicating that the updating of the number of actually printed copies has been completed to the user authentication module 211.

After receiving the information indicating that the updating of the number of actually printed copies has been completed from the user information management module 231, in step S322, the user authentication module 211 writes a current time into the log-out time 503 corresponding to the user ID in the log-in user information database 212, and then the processing ends.

Additionally, if it is determined in step S319 that the user has logged out of the image forming system, in another step (not shown), the user authentication module 211 notifies the controller 223 of the image forming apparatus 102 that the user has logged out of the image forming system. When receiving the notification from the user authentication module 211, the controller 223 performs control to inhibit the user from using the image forming apparatus 102.

The processing for controlling the number of actually printed copies is normally performed as described above with reference to FIG. 5. A case where the expansion management apparatus 101 has come into a state where communication with another apparatus is unavailable after sending the print permission information in step S310 is described next. In this case, the processing in step S315 cannot be performed. Accordingly, the expansion management apparatus 101 cannot receive information about the number of prints.

Now, processing performed by the expansion management apparatus 101 for acquiring information about the number of prints after data communication is restored, which is performed in order to address the above-described problem, will be described below with reference to FIG. 6.

In the present exemplary embodiment, the case where communication between the expansion management apparatus 101 and the image forming apparatus 102 is restored from the state in which the communication is unavailable includes the following cases (1) and (2).

(1) A case where communication is restored from the state in which communication is unavailable although both the expansion management apparatus 101 and the image forming apparatus 102 are powered on.

(2) A case where communication between the expansion management apparatus 101 and the image forming apparatus 102 is resumed by powering on either one or both of the expansion management apparatus 101 and the image forming apparatus 102 after either one or both of the expansion management apparatus 101 and the image forming apparatus 102 are powered off.

Figure 6:
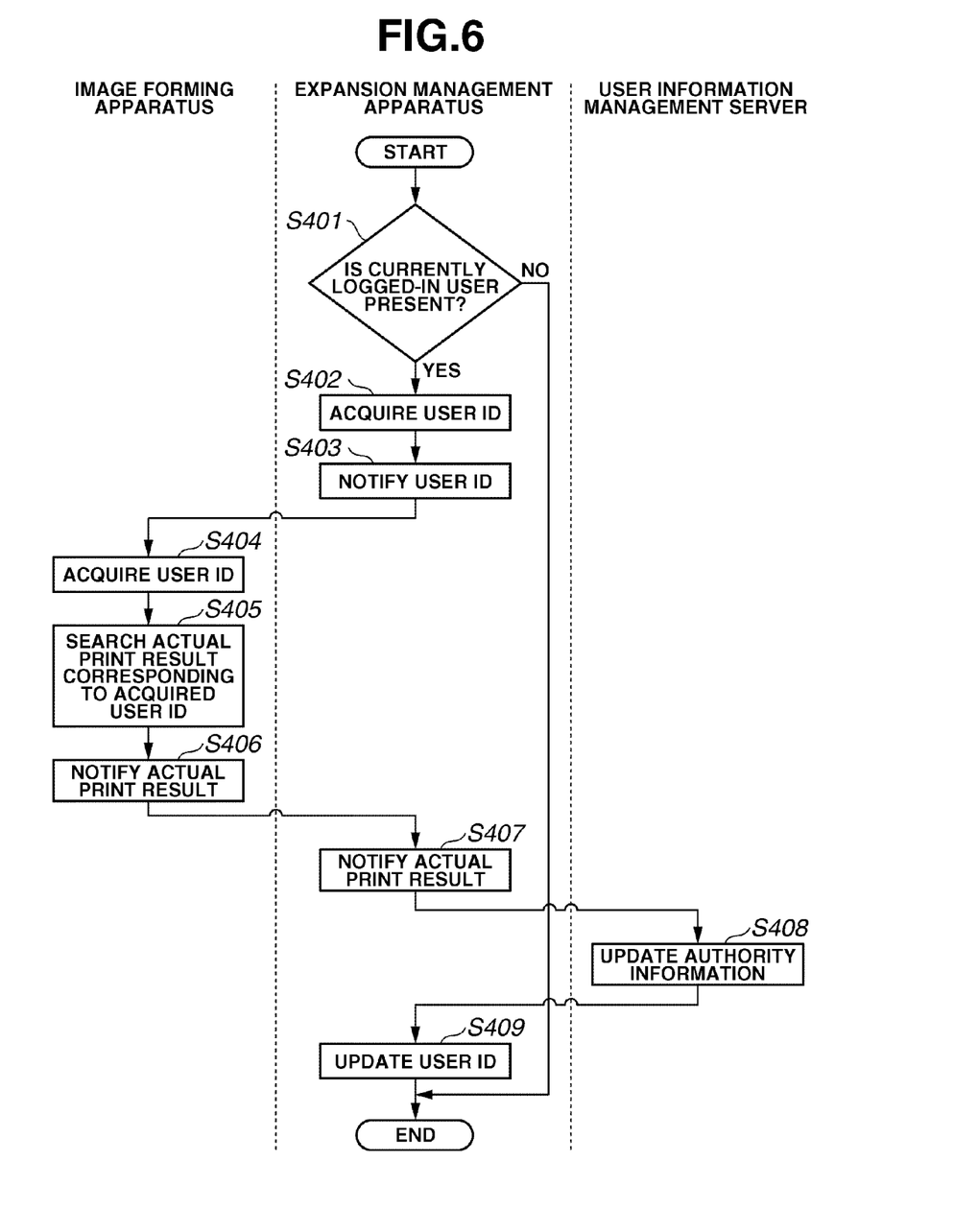
FIG. 6 is a flow chart illustrating another processing for controlling the number of prints.

FIG. 6 is a flow chart illustrating processing for controlling the number of prints. The processing illustrated in FIG. 6 corresponds to processing for acquiring information about the number of prints performed when the expansion management apparatus 101 returns to a state in which communication is available from a state in which communication is unavailable. Steps S401 through S403, S407, and S409 of the processing illustrated in FIG. 6 are performed by the user authentication module 211 of the expansion management apparatus 101 illustrated in FIG. 2. Steps S404 through S406 are performed by the controller 223 and the log collection module 221 of the image forming apparatus 102 illustrated in FIG. 2. Step S408 is performed by the user information management module 231 of the user information management server 103 illustrated in FIG. 2.

When communication is restored after a state in which communication is unavailable, in step S401, the user authentication module 211 of the expansion management apparatus 101 searches the log-in user information database 212 to check whether a user who is currently logged into the image forming system exists. The user who is currently logged into the image forming system is the one who has been permitted to use the image forming apparatus 102 immediately before the state in which communication is unavailable.

If it is determined in step S401 that no user is currently logged into the image forming system (NO in step S401), then the user authentication module 211 ends the processing.

On the other hand, if it is determined in step S401 that a user who has been logged into the image forming system exists (YES in step S401), then the user authentication module 211 advances to step S402, because the existence of a user who has logged into the image forming system indicates that the information about the number of prints (information about using of the image forming apparatus 102 by the user) is not completely collected.

In step S402, the user authentication module 211 acquires the user ID of the user who is currently logged into the image forming system and information about log-in time of the user corresponding to the user ID.

In step S403, the user authentication module 211 sends a request for the number of prints including the user ID and the information about the log-in time acquired in step S402 to the controller 223.

In step S404, the controller 223 receives the request for the number of prints including the user ID and the information about the log-in time from the user authentication module 211 and stores the acquired user ID and information about the log-in time on the RAM (not shown).

In step S405, the log collection module 221 searches for the number of prints using the user ID and the information about the log-in time acquired in step S404 as keys. More specifically, the log collection module 221 searches for a record whose value for the user ID 701 is the same as the user ID acquired in step S404, whose value for the printing data and time 702 indicates a time later than the log-in time, and for which the notification of the number of prints has not been completed. Furthermore, the log collection module 221 acquires the number of prints 703 included in the searched record. If a plurality of such records exists, the log collection module 221 acquires a sum of the values for the number of prints 703 respectively included in the plurality of records. In this case, however, the log collection module 221 can send the respective value for the number of prints 703 included in each of the plurality of records without computing a sum thereof to allow the user authentication module 211 to compute the sum of the values.

In step S406, the controller 223 sends the information about the number of prints acquired by the log collection module 221 in step S405 to the user authentication module 211.

The user authentication module 211 receives the information about the number of prints (information about use of the image forming apparatus 102 by the user) sent from the controller 223. In step S407, the user authentication module 211 sends the received information about number of prints (information about using of the image forming apparatus 102 by the user) to the user information management module 231 together with the user ID acquired in step S402.

The user information management module 231 acquires the information about the number of prints and the user ID sent from the user authentication module 211. In step S408, the user information management module 231 updates the user information management database 232 according to the acquired information about the number of prints and user ID. Furthermore, the user information management module 231 sends information indicating that the updating of the number of actually printed copies has been completed to the user authentication module 211.

The user authentication module 211 receives the information indicating that the updating of the number of actually printed copies has been completed from the user information management module 231. In step S409, the user authentication module 211 writes a current time into the log-out time 503 corresponding to the user ID in the log-in user information database 212, and then the user authentication module 211 ends the processing.

In the present exemplary embodiment, restriction on the number of prints in a copy operation is used as an example of a control of a print authority of a user. However, the restriction is not limited to this. That is, restriction can be applied on an amount of use of the image forming apparatus 102, such as the number of prints in printing according to print data from a client personal computer (PC) and the number of prints in printing using a BOX function. Here, the number of transferred images or the number of transfer operations in the case of using a function for transferring image data and the number of transmitted documents or the number of transmission operations in the case of using a facsimile function can be used as the amount of use of the image forming apparatus 102.

As described above, according to the present exemplary embodiment, the image forming system can acquire information about an operation performed on the image forming apparatus 102 by the user who has been permitted to use the image forming apparatus 102 (information about use of the image forming apparatus 102 by the user) during a time period in which communication between the expansion management apparatus 101 and the image forming apparatus 102 is unavailable.

That is, an administrator of the image forming system is not required to manually search information about an operation (information about use of the image forming apparatus 102 by the user) performed during a time period in which communication between the expansion management apparatus 101 and the image forming apparatus 102 is unavailable according to a log stored in the image forming apparatus 102. Accordingly, correct operation information can be automatically managed. Thus, the convenience of a system administrator can be improved.

Furthermore, dishonest utilizing of the image forming apparatus 102 by a user exceeding the scope of the user's authority can be prevented.

In addition, only one operation is performed for communication between the image forming apparatus 102 and the expansion management apparatus 101 in order to acquire operation information. Accordingly, wasteful data traffic between the image forming apparatus 102 and the expansion management apparatus 101 can be reduced.

Now, another exemplary embodiment of the present invention will be described below. In the above-described exemplary embodiment, the controller 223, the log collection module 221, and the log database 222 are installed on the image forming apparatus 102. Furthermore, the user authentication module 211 and the log-in user information database 212 are installed on the expansion management apparatus 101. That is, in the above-described exemplary embodiment, the controller 223, the log collection module 221, the log database 222, the user authentication module 211, and the log-in user information database 212 are separately installed on two apparatuses. In another exemplary embodiment, all of the above-mentioned modules are installed on one apparatus.

In the present exemplary embodiment, even when communication between the controller 223 and the user authentication module 211 becomes unavailable, information about all operations performed by a user who has currently logged in on an apparatus to be managed with the expansion management apparatus 101 can be completely collected when the communication is restored or resumed.

Furthermore, the user information management module 231 and the user information management database 232 can be installed on the same apparatus.

Moreover, only the user authentication module 211, the log-in user information database 212, the user information management module 231, and the user information management database 232 can be installed on one apparatus.

The structure and content of the above-described various data are not limited to those described above. That is, the data can be arbitrarily structured and can have an arbitrary content according to the purpose of use.

The present invention can be implemented in a system, an apparatus, a method, a program, or a storage medium storing the program, for example. More specifically, the present invention can be applied to a system including a plurality of devices and to an apparatus including one device.

Figure 8:
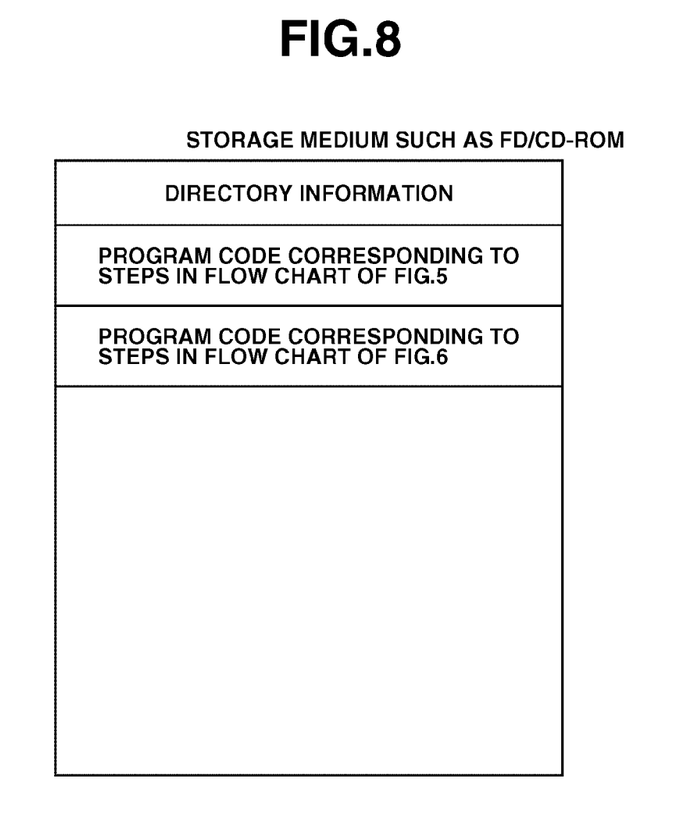
FIG. 8 illustrates a memory map of a storage medium storing a data processing program that can be read by each apparatus of the printing system.

FIG. 8 illustrates a memory map of a storage medium that stores various data processing programs that can be read by the expansion management apparatus 101, the image forming apparatus 102, and the user information management server 103, which constitute an information processing system.

Although not shown in FIG. 8, information for managing the programs stored in the storage medium, such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments illustrated in FIG. 5 and FIG. 6 can be implemented by a host computer using a program that is externally installed. In this case, the present invention is applied to the case where a group of information including a program is supplied to an output device from a storage medium, such as a CD-ROM, a flash memory, and a floppy disk (FD), or from an external storage medium via a network.

The present invention can also be achieved by providing a system or an apparatus with a storage medium storing program code (software) implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above.

Accordingly, the program can be configured in any form, such as object code, a program executed by an interpreter, and script data supplied to an OS.

As the storage medium for supplying such program code, a floppy disk, a hard disk, an optical disk, a magneto-optical disk (MO), a compact disc-read-only memory (CD-ROM), a CD-recordable (CD-R), a CD-rewritable (CD-RW), a magnetic tape, a nonvolatile memory card, a ROM, and a digital versatile disc (DVD), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (FTP) server for allowing a plurality of users to download the program file for implementing the functional processing configure the present invention.

In addition, the above program can also be supplied by distributing a storage medium such as a CD-ROM and the like which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit can carry out a part of or the whole of the processing to implement the functions of the embodiments described above.

In addition, the present invention can be applied to a system including a plurality of devices and to an apparatus that includes one device. Furthermore, the present invention can be implemented by supplying a system or an apparatus with a program. In this case, by reading the storage medium that stores a program described by software that can implement the present invention with the system or the apparatus, the system or the apparatus can implement the present invention.

As described above, the expansion management apparatus 101 stores log-in information of a user. Accordingly, even when communication between a data processing apparatus, such as the image forming apparatus 102, and an information processing apparatus, such as the expansion management apparatus 101, becomes unavailable (e.g., when the expansion management apparatus 101 is powered off) after user authentication is completed, the expansion management apparatus 101 can collect and manage data related to the processing performed by the user on the image forming apparatus 102 after the communication between the image forming apparatus 102 and the expansion management apparatus 101 is restored, according to the stored log-in information.

In the above-described exemplary embodiments, the image forming apparatus 102 is used as a data processing apparatus and the expansion management apparatus 101 manages the information about using of the image forming apparatus 102. However, the data processing apparatus according to the exemplary embodiments of the present invention is not limited to an image forming apparatus.

For example, a scanner apparatus can be used as the data processing apparatus. In this case, the expansion management apparatus 101 acquires information about using of the scanner apparatus (e.g., information about the number of scanned documents). Furthermore, a facsimile apparatus can be used as the data processing apparatus. In this case, the expansion management apparatus 101 acquires information about using of the facsimile apparatus (e.g., information about the number of documents sent via the facsimile apparatus).

Moreover, a computer or a terminal apparatus can be used as the data processing apparatus. In this case, the expansion management apparatus 101 acquires information about using of the computer or the terminal apparatus (e.g., information about the time length of use of the computer or the terminal apparatus).

In addition, these configurations are described as mere examples. That is, the data processing apparatus can be any kind of apparatus and the information that the expansion management apparatus 101 receives can be arbitrary information as long as the expansion management apparatus 101 can acquire information about using the data processing apparatus.

According to the exemplary embodiments of the present invention, wasteful information transmission can be reduced in acquiring information about using of a data processing apparatus by a user that has not been received by an information processing apparatus during a period in which communication between the information processing apparatus and the data processing apparatus is unavailable.

In addition, if a user has used the data processing apparatus during a period in which communication between the information processing apparatus and the data processing apparatus is unavailable, the information processing apparatus can acquire information about using of the data processing apparatus by the user.

Furthermore, an administrator of the image forming system is not required to manually search information about an operation performed during a period of time in which communication between the information processing apparatus and the data processing apparatus is unavailable according to a log stored in the data processing apparatus. Thus, the information processing apparatus can acquire information about using the data processing apparatus. Accordingly, the convenience of the system administrator can be improved.

In addition, the information processing apparatus determines whether to permit using of the data processing apparatus by a user. Accordingly, dishonest utilizing of the data processing apparatus by a user exceeding the scope of the user's authority can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
a storage unit configured to store user identification information for identifying the user who is logging on a printing apparatus;
a processor configured to determine whether a user who is logging on the printing apparatus exists based on the user identification information stored in the storage unit;
an acquisition unit configured to, in a case where the processor determines that a user who is logging on the printing apparatus exists based on the user identification information stored in the storage unit, when communication between the information processing apparatus and the printing apparatus is recovered from a state in which the communication is unavailable, acquire, from the printing apparatus, print information indicating an amount of printing which was performed by an instruction of the user identified by the user identification information stored in the storage unit, the print information having not been acquired during the state in which the communication is unavailable; and
a transmitting unit configured to transmit, to a server, the print information indicating an amount of printing which was performed by an instruction of the user acquired by the acquisition unit and the user identification information stored in the storage unit in order to update an amount of sheets which the user identified by the user identification information transmitted by the transmitting unit prints at the printing apparatus.

2. The information processing apparatus according to claim 1, further comprising a management unit configured to, when the user performs an operation for ending use of the printing apparatus or when no operation is performed on the printing apparatus for a predetermined period of time, delete the user identification information stored in the storage unit or add information indicating that use of the printing apparatus has ended to the user identification information stored in the storage unit.

3. The information processing apparatus according to claim 1, wherein the print restriction information of the user identified by the user identification information stored in the storage unit is updated with the print information acquired by the acquisition unit.

4. The information processing apparatus according to claim 1, further comprising:
   an authentication unit configured to receive authentication information of the user who uses the printing apparatus, and
   a transfer unit configured to transfer the authentication information to the server connectable to the information processing apparatus,
   wherein the storage unit stores the user identification information in a case where the user is authenticated based on the authentication information transferred by the transfer unit.

5. The information processing apparatus according to claim 1, wherein the storage unit stores time at which the user logs into the printing apparatus.

6. An information processing system comprising an information processing apparatus and a printing apparatus,
   the information processing apparatus including:
      a storage unit configured to store user identification information for identifying the user who is logging on the printing apparatus;
      a processor configured to determine whether a user who is logging on the printing apparatus exists based on the user identification information stored in the storage unit;
      an acquisition unit configured to, in a case where the processor determines that a user who is logging on the printing apparatus exists based on the user identification information stored in the storage unit, when communication between the information processing apparatus and the printing apparatus is recovered from a state in which the communication is unavailable, acquire, from the printing apparatus, print information indicating an amount of printing which was performed by an instruction of the user identified by the user identification information stored in the storage unit, the print information having not been acquired during the state in which the communication is unavailable; and
      a transmitting unit configured to transmit, to a server, the print information indicating an amount of printing which was performed by an instruction of the user acquired by the acquisition unit and the user identification information stored in the storage unit in order to update an amount of sheets which the user identified by the user identification information transmitted by the transmitting unit prints at the printing apparatus, and
   the printing apparatus including:
      a sending unit configured to send, to the information processing apparatus, print information of the user.

7. A non-transitory computer-readable storage medium storing a program which, when executed by an apparatus, causes the apparatus to perform steps of:
   storing, in a storage unit, user identification information for identifying a user as the user who uses a printing apparatus and who is logging on the printing apparatus;
   determining using a processor, whether a user who is logging on the printing apparatus exists based on the user identification information stored in the storage unit;
   acquiring, from the printing apparatus, in a case where it is determined that a user who is logging on the printing apparatus exists based on the user identification information stored in the storage unit, when communication between an information processing apparatus and the printing apparatus is recovered from a state in which the communication is unavailable, print information indicating an amount of printing which was performed by an instruction of the user identified by the user identification information stored in the storage unit, the print information having not been acquired during the state in which the communication is unavailable; and
   transmitting to a server, the acquired print information indicating an amount of printing which was performed by an instruction of the user and the user identification information stored in the storage unit in order to update an amount of sheets which the user identified by the user identification information transmitted prints at the printing apparatus.

* * * * *